June 26, 1928.  W. P. TURNER  1,674,811
HOG WATERER
Filed March 16, 1926
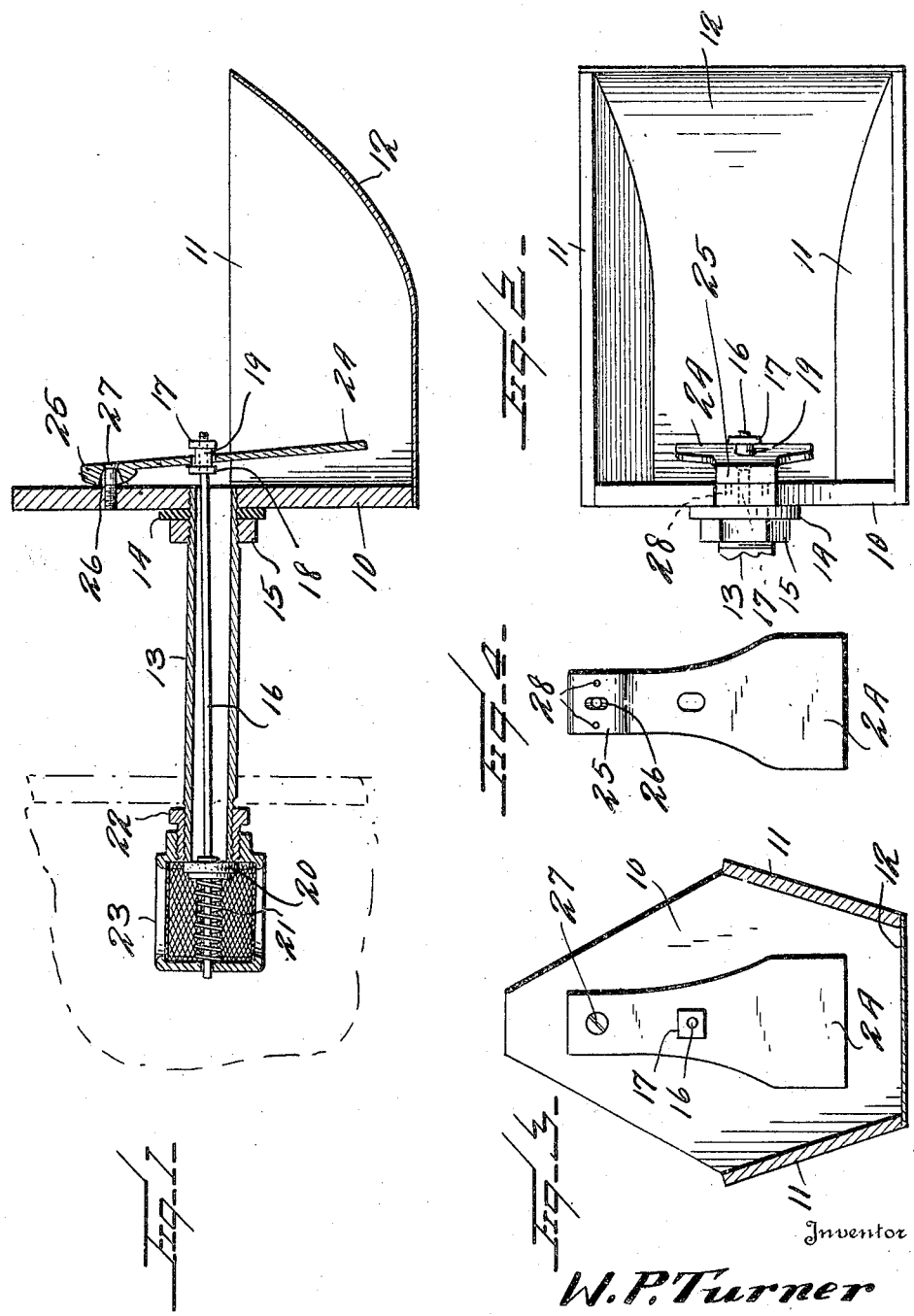
Inventor
W. P. Turner
By Watson E. Coleman
Attorney Patented June 26, 1928.

1,674,811

UNITED STATES PATENT OFFICE.

WILLIAM P. TURNER, OF OAKLAND, IOWA.

HOG WATERER.

Application filed March 16, 1926. Serial No. 95,069.

This invention relates to devices for watering hogs and particularly to that class of hog waterers wherein there is provided a small bowl having a pipe extending therefrom and adapted to be connected to a source of supply as for instance, a barrel, and means provided within the bowl to cause the opening of a valve to permit the inlet of water to the pipe and bowl, these means being actuated by the insertion of the snout of the hog into the bowl.

The general object of the invention is to provide a very simple and effective device of this character in which the bowl is so formed that it may be readily cleaned and kept clean without undue work and wherein the pipe is provided with a strainer preventing foreign matter from flowing into the bowl.

A further object is to provide a valve so disposed that water will not fill the inlet pipe of the bowl and freeze therein and further provide means whereby the valve may be adjusted to regulate the flow of water when the valve is opened by the hog.

Other objects have to do with the details of construction and arrangement of parts to appear more fully hereinafter.

My invention is illustrated in the accompanying drawings wherein:—

Figure 1 is a sectional view through a hog waterer constructed in accordance with my invention;

Fig. 2 is a fragmentary top plan view of Figure 1;

Fig. 3 is a section looking toward the rear end of the bowl;

Fig. 4 is a side face view of the operating lever;

Referring to these drawings it will be seen that the trough consists of the end member 10 which may be made of any suitable material, the sides 11 which extend upward and outward, and the bottom 12 which is attached to the lower edge of the end member and extends upward and outward to the upper edges of the side members 11. The bottom of the bowl thus has an easy curvature upward and outward which permits the ready removal of foreign matter from the bowl. Mounted upon the back 10 is the pipe 13 which is screw-threaded at its forward and rear ends and is engaged with the back in any suitable manner and is illustrated as being provided with a washer 14 and a nut 15 bearing against the rear face of the back piece 10. The opposite end of this pipe constitutes a valve seat, and extending longitudinally through the valve is a rod 16, the forward end of which is screw-threaded for the reception of nuts 17 and 18, the nut 18 being formed with a nipple or bushing 19.

The rear end of the rod 16 carries upon it the valve 20 and engaging with the rear end of the pipe and surrounding the rod is a spiral spring 21. Mounted upon the screw-threaded end of the pipe 13 is a screw-threaded bushing 22. Engaged with this bushing is a strainer 23 having its major portion formed of wire gauze and the rear of the strainer having an aperture through which the valve rod passes. The spring 21 bears against the wall of this aperture and against the valve and urges the rod 16 forward and the valve to a closed position.

Mounted for rocking movement upon the back 10 is the operating lever 24 which is spatulate in form to provide a relatively broad lower end disposed within the lower portion of the trough. The middle of the lever is provided with an elliptical opening through which the bushing 19 extends loosely and the upper end of the lever is formed with a rounded rocker 25 having an elongated aperture 26 for the passage of the screw 27. Preferably the upper end of the rocker is also provided on each side of the aperture 26 with inwardly projecting studs 28 engaging in recesses in the face of the back piece 10.

It is to be particularly noted that the lower portion of the pipe is on a line with the upper edge of the basin or bowl 11 and that the rod 16 is disposed adjacent the upper wall of the pipe 13. By so disposing the rod any water left in the pipe will not touch the valve rod and be likely to freeze thereto. By adjusting the screw 27 the freedom of movement of the lever 24 may be readily regulated and by adjusting the nuts 17 and 18 the amount of opening movement of the valve may be regulated. This adjustment may be made in the bowl itself so that there is no necessity of inserting the hands into the barrel or tank or even getting the hands wet.

The studs 28 act to hold the lever from any lateral movement which would tend to jam it and thus force the valve off its seat. Inasmuch as foreign matter cannot pass through the strainer it is obvious that no matter will be likely to lodge upon the seat of the valve and prevent the valve from closing. By adjusting the strainer upon the bushing 22 or adjusting the bushing on the extremity of the pipe 13 it is possible to regulate the tension of the spring 21 upon the valve.

It is to be particularly noted that the actuating lever 24 extends downward at the rear end of the bowl and this is accompanied by several advantages. Thus where the actuating lever extends horizontally a hog is very liable to put his feet in the bowl and pressing down upon the lever causes the water to be wasted and eventually form a hog wallow around the bowl. In my construction the snout of the hog presses against the lever to cause the valve to open. In horizontal levers there is great likelihood of dirt accumulating upon the top of the lever. This cannot occur with my device. Furthermore, where a horizontal lever is used the water must practically fill the bowl before the hog can get anything to drink whereas with my construction only a small amount of water need enter the bowl in order to satisfy the hog and as soon as the hog gets this small amount of water and withdraws his snout the valve closes, thus stopping the further flow and any waste. Inasmuch as the entrance pipe is disposed considerably above the bottom of the bowl this pipe will readily drain into the bowl and thus there will be no liability of the pipe freezing up. The valve itself is disposed within the water barrel or tank and thus is not likely to freeze and inasmuch as there is no water ordinarily within the pipe 13 this will not freeze. The bottom wall of the pipe 13 is located, as before remarked, level with the top of the wall of the bowl and this is very essential for the reason that even if the bowl becomes full, the pipe, having no water in it, cannot freeze.

I claim:—

A stock watering device comprising a bowl having a rear wall, end walls and an upwardly inclined front wall, an inlet pipe extending horizontally from the rear wall and adapted to extend into a water tank, the rear end of the pipe constituting a valve seat, a strainer housing having screw-threaded engagement with the rear end of the pipe and having a central opening in its rear wall, the housing having openings in its side walls, a cylindrical strainer disposed within the housing, a valve rod extending through the pipe and carrying a valve coacting with the seat, the rear end of the valve rod passing through said opening in the rear wall of the strainer housing, a spring surrounding the valve rod and urging the valve to its seat, said spring being disposed within the strainer and the tension of the spring being adjustable by adjusting the strainer housing upon the pipe, a lever fulcrumed at its upper end upon the rear wall and extending downward nearly parallel thereto and into said bowl, through which lever the rod passes, and means engaging the lever with the rod and adjustable upon the rod to thereby adjust the lever with relation to the rod.

In testimony whereof I hereunto affix my signature.

WILLIAM P. TURNER.